(12) United States Patent
Ishigaki et al.

(10) Patent No.: US 6,448,927 B1
(45) Date of Patent: Sep. 10, 2002

(54) POSITION INFORMATION SYSTEM

(75) Inventors: Toshihiro Ishigaki; Arata Kurosawa; Masaki Arima; Akifumi Miyano, all of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/830,047
(22) PCT Filed: Aug. 23, 2000
(86) PCT No.: PCT/JP00/05646
§ 371 (c)(1),
(2), (4) Date: Apr. 20, 2001
(87) PCT Pub. No.: WO01/14832
PCT Pub. Date: Mar. 1, 2001

(30) Foreign Application Priority Data

Aug. 24, 1999 (JP) .............................................. 11-237434

(51) Int. Cl.⁷ .............................. H04B 7/185; G01S 5/02
(52) U.S. Cl. ........................... 342/357.06; 342/357.01; 342/357.13; 701/213
(58) Field of Search ...................... 342/357.01, 357.06, 342/357.13; 701/207, 213

(56) References Cited

U.S. PATENT DOCUMENTS

| | | | | |
|---|---|---|---|---|
| 5,343,493 A | * | 8/1994 | Karimullah | 375/1 |
| 5,497,149 A | * | 3/1996 | Fast | 340/988 |
| 5,515,043 A | * | 5/1996 | Berard et al. | 340/988 |
| 5,736,962 A | * | 4/1998 | Tendler | 342/357 |
| 5,786,789 A | * | 7/1998 | Janky | 342/357 |
| 5,890,061 A | * | 3/1999 | Timm et al. | 455/404 |
| 6,239,700 B1 | * | 5/2001 | Hoffman et al. | 340/539 |
| 6,275,164 B1 | * | 8/2001 | MacConnell et al. | 340/692 |

FOREIGN PATENT DOCUMENTS

| | | |
|---|---|---|
| JP | 8-297159 | 11/1996 |
| JP | 9-312606 | 12/1997 |
| JP | 10-155175 | 6/1998 |
| JP | 10-206520 | 8/1998 |
| JP | 10-221426 | 8/1998 |
| JP | 11-8583 | 1/1999 |
| JP | 11-83529 | 3/1999 |
| JP | 2000-65913 | 3/2000 |

* cited by examiner

Primary Examiner—Dao Phan
(74) Attorney, Agent, or Firm—Pearne & Gordon LLp

(57) ABSTRACT

In a position informing apparatus using position-measuring means, such as a GPS receiver, and communications means, such as a portable cellular phone, the operating time of the position-measuring means is shortened, thereby diminishing power consumption.

Communications means (3), such as a portable cellular phone, of the position informing apparatus is provided with a position-measuring request button (3b) Position-measuring (1), such as a GPS receiver, is usually held in a power-off state, and the communications means (3) remains in a standby state. When the position-measuring request button (3b) is pressed, a control section (2) turns on power to the position-measuring means (1). A signal output from a GPS satellite is received by means of a position-measuring antenna (1a), and the position-measuring means (1) effects position-measuring operation. When position-measurement information is determined, the control section (2) sends the position-measurement information to the communications means (3), thus turning off power to the position-measuring means (1). The communications means (3) retains position information. When access is made to the communications means (3) from the outside, the position information is transmitted by way of a communications antenna (3a) . Alternatively, a predetermined number is automatically dialed, whereby the position information is transmitted.

19 Claims, 7 Drawing Sheets

POSITION INFORMATION SYSTEM

TECHNICAL FIELD

The present invention relates to a position informing apparatus, and more particularly, to a position informing apparatus used in a position information service in which the position of a portable cellular phone is informed in the event of an emergency report, or in which the geographical information about the surrounding area is provided in response to information of the position of a portable digital assistant, as well as in a position management system which monitors positions of commercial vehicles or police vehicles.

BACKGROUND ART

An example of a conventional position informing apparatus is described in Japanese Patent Application No. Hei. 11-83529, and the configuration of the apparatus is shown in FIG. 13. As shown in FIG. 13, reference numeral 1 designates position-measuring means, such as a GPS receiver; 1a designates a position-measuring antenna for receiving a signal from a GPS satellite; 27 designates a control section for controlling activation/deactivation of power to the position-measuring means 1; 11 designates communications means, such as a portable cellular phone or a PHS; 11a designates a communications antenna; 9 designates a storage section for storing the result of position-measuring; 28 designates an acceleration sensor; and 29 designates a gyroscope serving as a directional sensor.

By reference to FIG. 13, the operation of the conventional position informing apparatus will now be described. The acceleration sensor 28, the gyroscope 29, and the control section 27 operate at all times. Power is supplied also to the storage section 9 at all times, thus enabling retention of stored data. The control section 27 determines a travel distance from the acceleration information obtained by the acceleration sensor 28 and the directional information obtained by the gyroscope 29. When the travel distance exceeds a given value, the control section 27 turns on power to the position-measuring means 1. On the basis of the signal received by the position-measuring antenna 1a, the position-measuring means 1 tracks three satellites or four or more satellites and completes computation of the position of the position informing apparatus. Then, the thus-computed current position is stored in the storage section 9, and power to the position-measuring means 1 is turned off.

The communications means 11 is usually held in a standby state. When access is made to the communications means 11 from the outside, a request for current position is sent to the control section 27. The control section 27 reads the current position from the storage section 9 and sends the thus-read position to the communications means 11. The communications means 11 sends the current position to the outside by way of the communications antenna 11a.

Thus, even the conventional position informing apparatus can provide information of a current position without power to the position-measuring means 1 remaining ON at all times.

In the conventional position informing apparatus, the gyroscope 29 and the acceleration sensor 28 remain operative at all times, thus involving dissipation of a large amount of current.

The present invention is aimed at solving the problems of the conventional position informing apparatus described above and reducing the amount of current to be dissipated by the position informing apparatus.

DISCLOSURE OF INVENTION

In order to solve the foregoing problems, the present invention provides a position informing apparatus comprising: position-measuring means for measuring the current position of the position informing apparatus; a control section for controlling power to the position-measuring means; communications means having a position-measuring request button; and means for turning on power to the position-measuring means only when a position-measuring request button is pressed, thereby effecting position-measuring operation.

By means of such a configuration, the position-measuring request button is pressed only when current position information is required, thereby turning on power to the position-measuring means and performing position-measurement. As a result, circuits or components which would be operative at all times are eliminated, thereby reducing dissipation of an electric current.

Further, the position informing apparatus is equipped with a storage section for storing a position and a timer for periodically outputting an instruction for effecting position-measurement. By means of such a configuration, the position of the position informing apparatus is periodically stored. Even at a position where position-measurement cannot be effected even when a position-measuring request is made; for example, a tunnel, position information becomes available even when only somewhat outdated position information is available.

The position informing apparatus is further comprising means for supplying power individually to a signal demodulation section and a position-measuring computation section of the position-measuring means; means for turning on power to only the signal demodulation section until position-measurement information is received; and means for turning off power to the signal demodulation section by means of turning on power to the position-measuring computation section upon receipt of position-measurement information. Such a configuration enables a reduction in mean electric power consumed by the position informing apparatus.

The position informing apparatus is further provided with means for supplying a clock individually to a signal demodulation section and a position-measuring computation section of the position-measuring means; means for supplying a clock signal to only the signal demodulation section until position-measurement information is received; and means for stopping supply of the clock signal to the signal demodulation section by means of supplying a clock signal to the position-measuring computation section when position-measurement information is received. Such a configuration enables a reduction in mean electric power consumed by the position informing apparatus, by means of supplying a clock signal to only a required portion.

Figure 1:
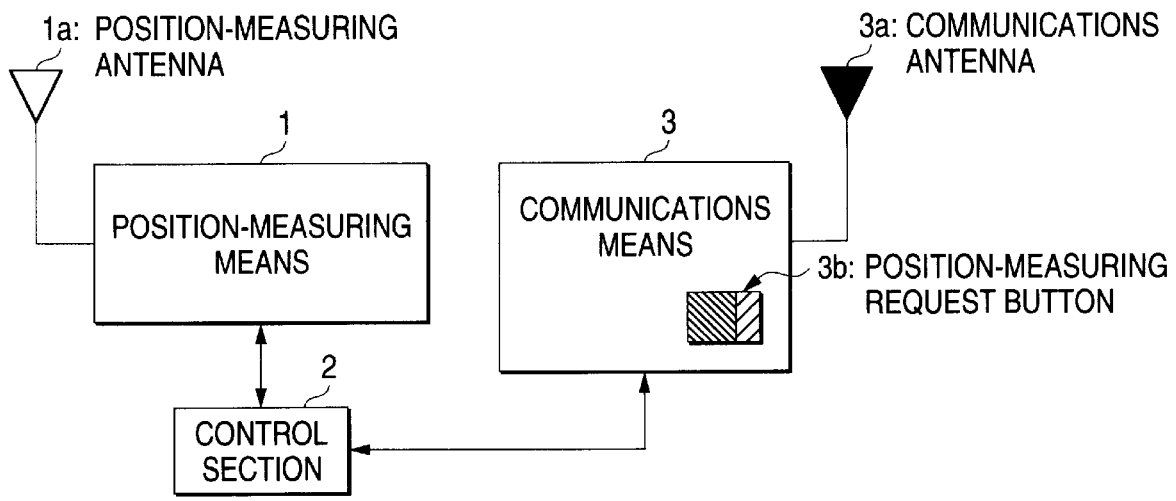
FIG. 1 is a block diagram showing the configuration of a position informing apparatus according to a first embodiment of the present invention.

Throughout the drawings, reference numerals 1 and 16 designate position-measuring means; 1a, 16a, 18a, 21a, and 24a designate position-measuring antennas; 2, 8, 12, 14, 17, 20, 23, 26, and 27 designate control sections; 3, 4, 5, 6, 7, 11, and 13 designate communications means; 3a, 4a, 5a, 6a, 7a, 11a, and 13a designate communications antennas; 3b and 7b designate position-measuring request buttons; 9 designates a storage section; 10 and 15 designate timers; 28 designates an acceleration sensor; 29 designates a gyroscope; 18, 21, and 24 designate signal demodulation section; and 19, 22, and 25 designate position-measuring computation sections.

BEST MODE FOR CARRYING OUR THE INVENTION

Embodiments of the present invention will be described in detail hereinbelow with reference to FIGS. 1 through 12.

(First Embodiment)

A first embodiment of the present invention relates to a position informing apparatus which effects position-measurement by means of turning on power to a GPS receiver only when a position-measuring request button provided on a portable cellular phone is pressed.

FIG. 1 is a block diagram showing the configuration of a position informing apparatus according to the first embodiment of the present invention. As shown in FIG. 1, reference numeral 1 designates position-measuring means such as a GPS receiver; 1a designates an antenna for position-measuring purpose which receives a signal output from a GPS satellite; 2 designates a control section for controlling activation/deactivation of power to the position-measuring means 1; 3 designates communications means such as a portable cellular phone or a PHS; 3a designates a communications antenna; and 3b designates a position-measuring request button.

The operation of the position informing apparatus having the foregoing configuration according to the first embodiment of the present invention will be described. In normal times, the position-measuring means 1 remains in a power-deactivated state, and the communications means 3 remains in a standby state, thus suppressing current dissipation. When the position-measuring request button 3b provided on the communications means 3 is pressed, the communications means 3 sends a position-measuring request to the control section 2, and the control section 2 turns on power to the position-measuring means 1. In accordance with a signal received by the antenna 1a, the position-measuring means 1 tracks three satellites or four or more satellites, thus performing position-measuring computation. The control section 2 sends the thus-computed current position to the communications means 3, thereby turning off power to the position-measuring means 1.

The communications means 3 retains the current position. When access is made to the communications means 3 from the outside, the communications means 3 sends the current position to the outside by way of the communications antenna 3a. Alternatively, upon receipt of the current position from the control section 2, the communications means 3 automatically dials a predetermined number, to thereby transmit the current position to the outside.

As mentioned above, in the first embodiment, the position informing apparatus is constructed so as to turn on power to the GPS receiver only when the position-measuring request button provided on the portable cellular phone is pressed, thereby performing position-measurement. As a result, circuits and components which remain operative at all times are obviated, thereby reducing current dissipation.

(Second Embodiment)

A second embodiment according to the present invention relates to a position informing apparatus which turns on power to a GPS receiver only when existing buttons provided on a portable cellular phone are pressed in a specific pattern, thereby effecting position-measurement.

Figure 2:
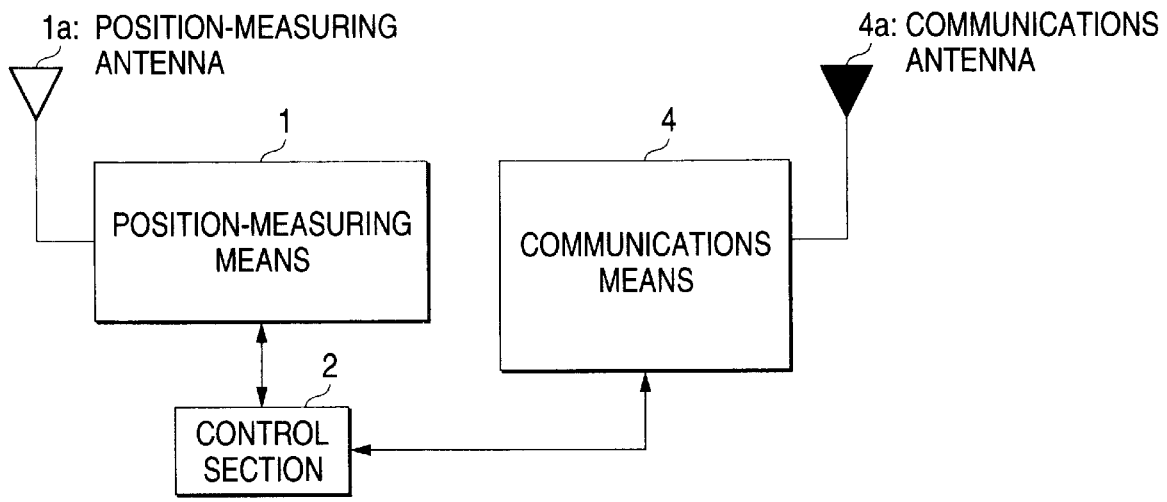
FIG. 2 is a block diagram showing the configuration of a position informing apparatus according to a second embodiment of the present invention.

FIG. 2 is a block diagram showing the configuration of a position informing apparatus according to the second embodiment. As shown in FIG. 2, reference numeral 1 designates position-measuring means such as a GPS receiver; 1a designates an antenna for position-measuring purpose which receives a signal output from a GPS satellite; 2 designates a control section for controlling activation/ deactivation of power to the position-measuring means 1; 4 designates communications means such as a portable cellular phone or a PHS; and 4a designates a communications antenna.

The operation of the position informing apparatus having the foregoing configuration according to the second embodiment of the present invention will be described. In normal times, the position-measuring means 1 remains in a power-deactivated state, and the communications means 4 remains in a standby state, thus suppressing current dissipation. When buttons provided on the communications means 4 are pressed in a predetermined pattern such as "*#*," the communications means 4 sends a position-measuring request to the control section 2, and the control section 2 turns on power to the position-measuring means 1. In accordance with a signal received by the antenna 1a, the position-measuring means 1 tracks three satellites or four or more satellites, thus performing position-measuring computation. The control section 2 sends the thus-computed current position to the communications means 4, thereby turning off power to the position-measuring means 1.

The communications means 4 retains the current position. When access is made to the communications means 4 from the outside, the communications means 4 sends the current position to the outside by way of the communications antenna 4a. Alternatively, upon receipt of the current position from the control section 2, the communications means 4 automatically dials a predetermined number, to thereby transmit the current position to the outside.

As mentioned above, in the second embodiment, the position informing apparatus is constructed so as to turn on power to the GPS receiver only when existing buttons provided on the portable cellular phone are pressed in a predetermined pattern, thereby effecting position-measurement. As a result, mean power consumption of the position informing apparatus can be reduced.

(Third Embodiment)

A third embodiment according to the present invention relates to a position informing apparatus which effects position-measurement only when a specific number is dialed by means of a portable cellular phone.

Figure 3:
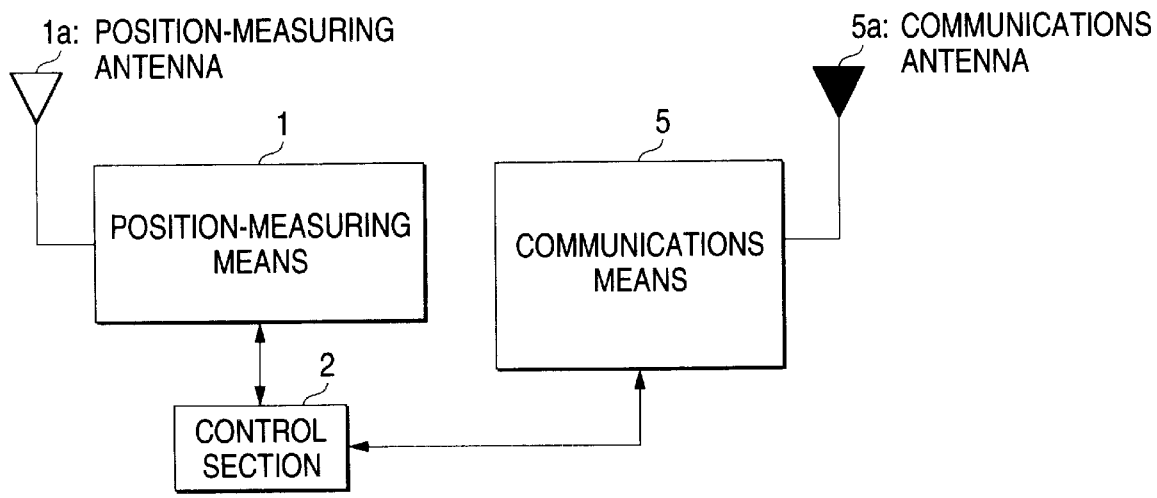
FIG. 3 is a block diagram showing the configuration of a position informing apparatus according to a third embodiment of the present invention.

FIG. 3 is a block diagram showing the configuration of a position informing apparatus according to the third embodiment. As shown in FIG. 3, reference numerals 1, 1a, and 2 designate identical with that described in connection with the second embodiment, and hence repeated explanation thereof is omitted here. Reference numeral 5 designates communications means such as a portable cellular phone or a PHS; and 5a designates a communications antenna. The communications means 5 is arranged so as to issue a position-measurement request to the control section 2 when a specific number is dialed. Only when a specific phone number, such as that for an emergency report, is dialed, the current position is determined automatically.

As mentioned above, in the third embodiment, the position informing apparatus is constructed such that position-measurement is effected only when a portable cellular phone dials a specific phone number. Hence, mean power consumption of a position informing apparatus can be reduced.

(Fourth Embodiment)

A fourth embodiment of the present invention relates to a position informing apparatus which determines the current position of the apparatus only when a portable cellular phone has received an incoming call from a specific phone number.

Figure 4:
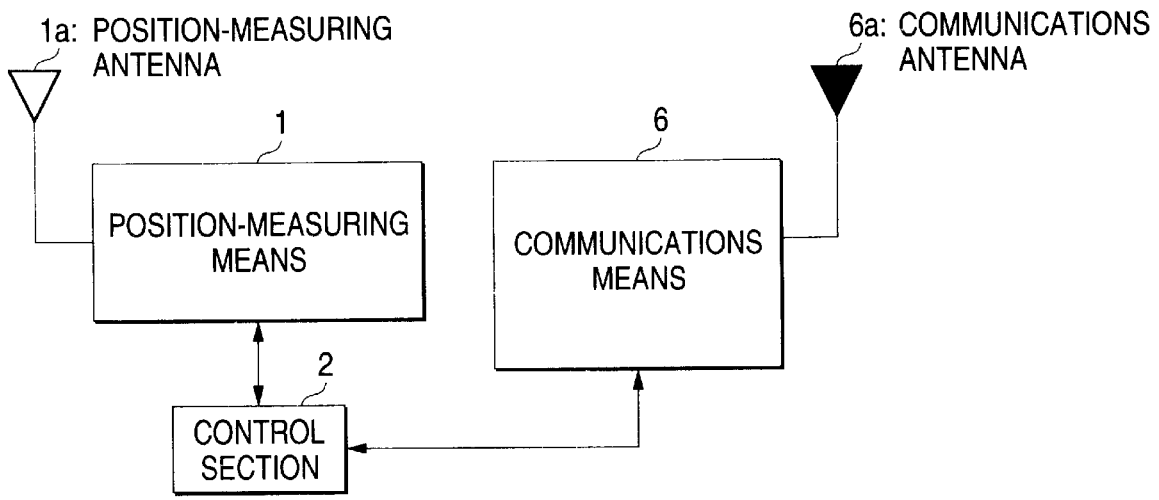
FIG. 4 is a block diagram showing the configuration of a position informing apparatus according to a fourth embodiment of the present invention.

FIG. 4 is a block diagram showing the configuration of a position informing apparatus according to the fourth embodiment. As shown in FIG. 4, reference numerals 1, 1a, and 2 designate identical with that described in connection with the second embodiment, and hence repeated explanation thereof is omitted here. Reference numeral 6 designates communications means such as a portable cellular phone or a PHS; and 6a designates a communications antenna. The communications means 6 is arranged so as to issue a position-measuring request to the control section 2 upon receipt of an incoming call from a specific phone number.

In the fourth embodiment, the position informing apparatus is constructed so as to effect position-measurement only when a portable cellular phone has received an incoming call from a specific phone number. As a result, a center can manage the position of the position informing apparatus.

(Fifth Embodiment)

A fifth embodiment of the present invention relates to a position informing apparatus which inhibits position-measurement when a portable cellular phone is outside a range of communication.

Figure 5:
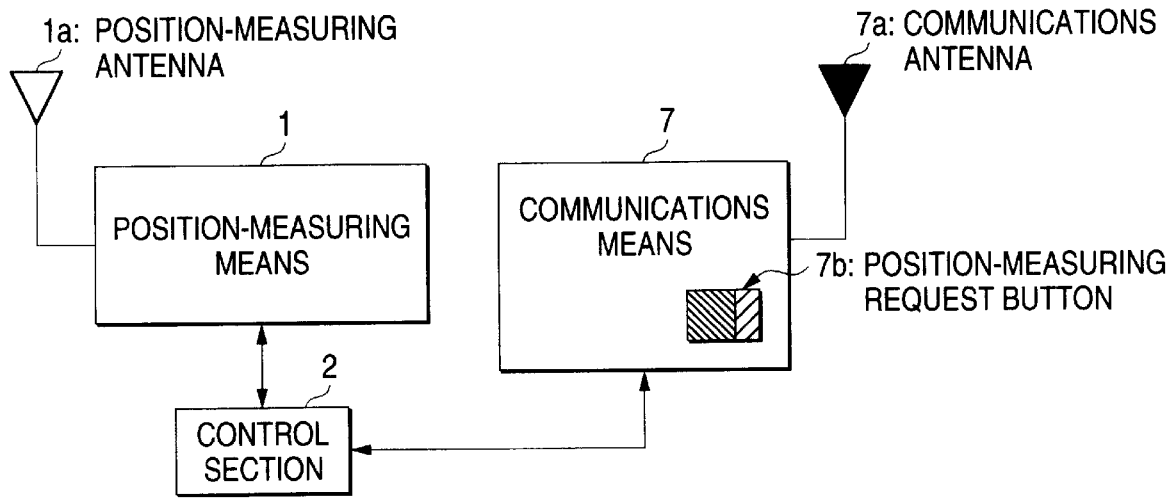
FIG. 5 is a block diagram showing the configuration of a position informing apparatus according to a fifth embodiment of the present invention.

FIG. 5 is a block diagram showing the configuration of a position informing apparatus according to the fifth embodiment. As shown in FIG. 5, reference numerals 1, 1a, and 2 designate identical with that described in connection with the second embodiment, and hence repeated explanation thereof is omitted here. Reference numeral 7 designates communications means such as a portable cellular phone or a PHS; 7a designates a communications antenna; and 7b designate a position-measuring request button. The communications means 7 is arranged so as to issue a position-measuring request to the control section 2 when the position-measuring request button 7b is pressed. However, when detecting that the portable cellular phone is outside the range of communication, the communications means 7 does not issue any position-measuring request.

As mentioned above, in the fifth embodiment, the position informing apparatus is constructed so as to inhibit position-measurement when the portable cellular phone is outside a range of communication, thereby avoiding a useless position-measuring operation, which would otherwise be performed when the result of position-measurement cannot be reported in spite of the current position of the apparatus having been determined.

(Sixth Embodiment)

A sixth embodiment of the present invention relates to a position informing apparatus which periodically determines a current position by means of a timer and a GPS receiver and stores the thus-determined position information.

Figure 6:
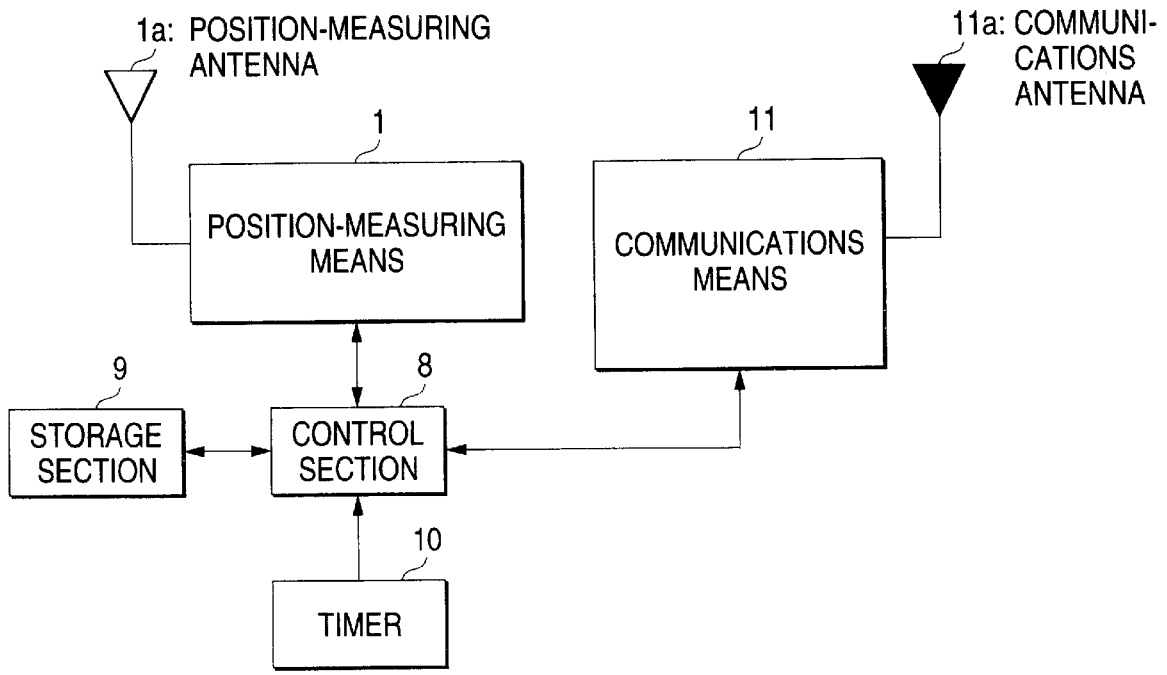
FIG. 6 is a block diagram showing the configuration of a position informing apparatus according to a sixth embodiment of the present invention.

FIG. 6 is a block diagram showing the configuration of a position informing apparatus according to the sixth embodiment. As shown in FIG. 6, reference numeral 1 designates position-measuring means such as a GPS receiver; 1a designates an antenna for position-measuring purpose which receives a signal output from a GPS satellite; 8 designates a control section for controlling activation/deactivation of power to the position-measuring means 1; 11 designates communications means such as a portable cellular phone or a PHS; 11a designates a communications antenna; 9 designates a storage section for storing a current position; and 10 designates a timer for causing an interrupt at an interval during which power to the position-measuring means is turned on.

The operation of the position informing apparatus having the above-described construction according to the sixth embodiment of the present invention will now be described. A predetermined time interval is set on the timer 10 beforehand. An interrupt arises in the control section 8 at the time interval. Upon receipt of the interrupt caused by the timer 10, the control section 8 turns on power to the position-measuring means 1. In accordance with a signal received by the antenna 1a, the position-measuring means 1 tracks three satellites or four or more satellites, thus effecting position-measuring computation. The control section 8 stores the thus-computed current position into the storage section 9, thereby turning off power to the position-measuring means 1.

When access is made to the communications means 11 from the outside, the communications means 11 issues a current position-measuring request to the control section 8. The control section 8 acquires an updated current position from the storage section 9 and sends the position to the communications means 11. The communications means 11 sends the current position to the outside by way of the communications antenna 11a.

In the sixth embodiment, the position informing apparatus is constructed so as to periodically determine a current position by means of a timer and a GPS receiver and to store the determined position information. Position information can be retained for a case where position information may be required at a position where position-measurement is impossible even when a positioning request is received.

(Seventh Embodiment)

A seventh embodiment of the present invention relates to a position informing apparatus which does not position-measures during a communication operation of a portable cellular phone.

Figure 7:
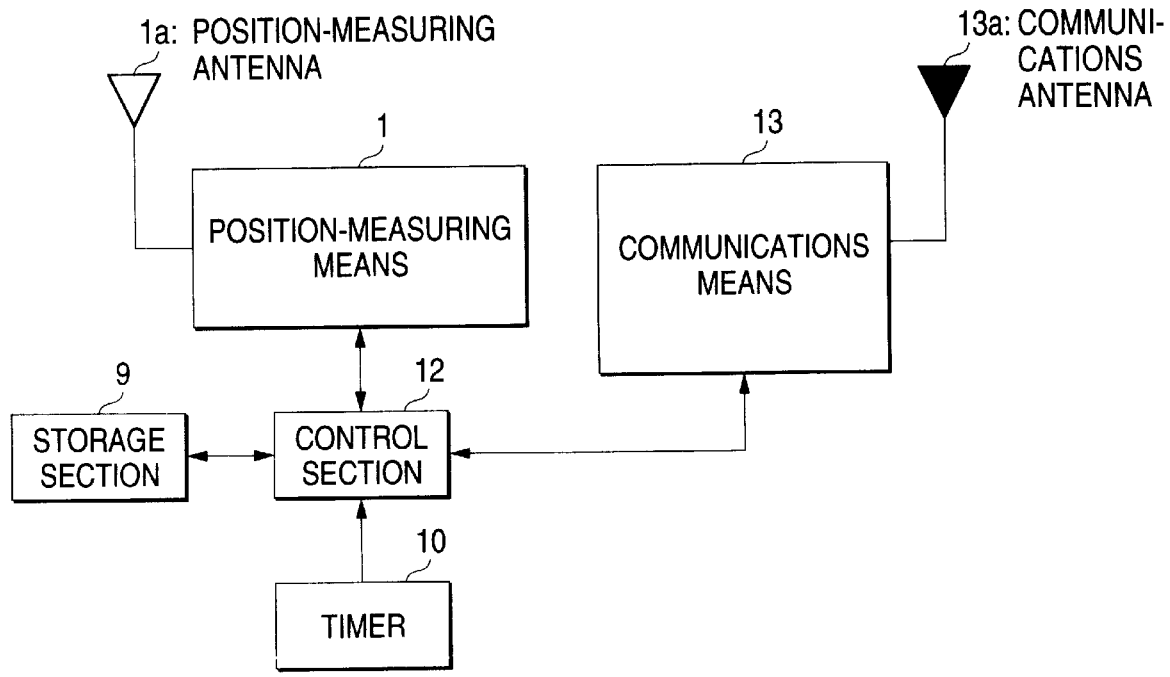
FIG. 7 is a block diagram showing the configuration of a position informing apparatus according to a seventh embodiment of the present invention.

FIG. 7 is a block diagram showing the configuration of a position informing apparatus according to the seventh embodiment. As shown in FIG. 7, reference numerals 1, 1a, 9, and 10 designate identical with that described in connection with the sixth embodiment, and hence repeated explanation thereof is omitted here. Reference numeral 12 designates a control section for controlling activation/deactivation of the position-measuring means 1; 13 designates communications means, such as a portable cellular phone or a PHS; and 13a designates a communications antenna.

The operation of the position informing apparatus having the above-described construction according to the seventh embodiment of the present invention will be described. A predetermined time interval is set on the timer 10 beforehand. An interrupt arises in the control section 12 at the time interval. During a communication period, the communications means 13 sends to the control section 12 a signal stating that communication is being carried out.

When receiving an interrupt output from the timer 10 while the communications means 13 is in a non-communicating state, the control section 12 turns on power to the position-measuring means 1. In accordance with a signal received by the antenna 1a, the position-measuring means 1 tracks three satellites or four or more satellites, thus effecting position-measuring computation. The control section 12 stores the thus-computed current position into the storage section 9, thereby turning off power to the position-measuring means 1.

While the communications means 13 is in a communicating state, the control section 12 does not turn on power to the position-measuring means 1 even when receiving an interrupt from the timer 10. The control section 12 does not turn on power to the position-measuring means 1 before receiving the next interrupt or before the communications means 13 enters a non-communicating state. When the communications means 13 enters a communicating state while power to the position-measuring means 1 is maintained ON, power to the position-measuring means 1 is turned off before completion of position-measuring computation.

As mentioned above, in the seventh embodiment, the position informing apparatus is constructed so as not to perform position-measurement during a communication operation of a portable cellular phone. Particularly, during a transmission operation, there can be prevented useless position-measurement, which would otherwise arise when position-measurement is hindered by interference of electronic waves from a portable cellular phone.

(Eighth Embodiment)

An eighth embodiment of the present invention relates to a position informing apparatus which changes a time interval for performing a position-measurement in accordance with a velocity.

Figure 8:
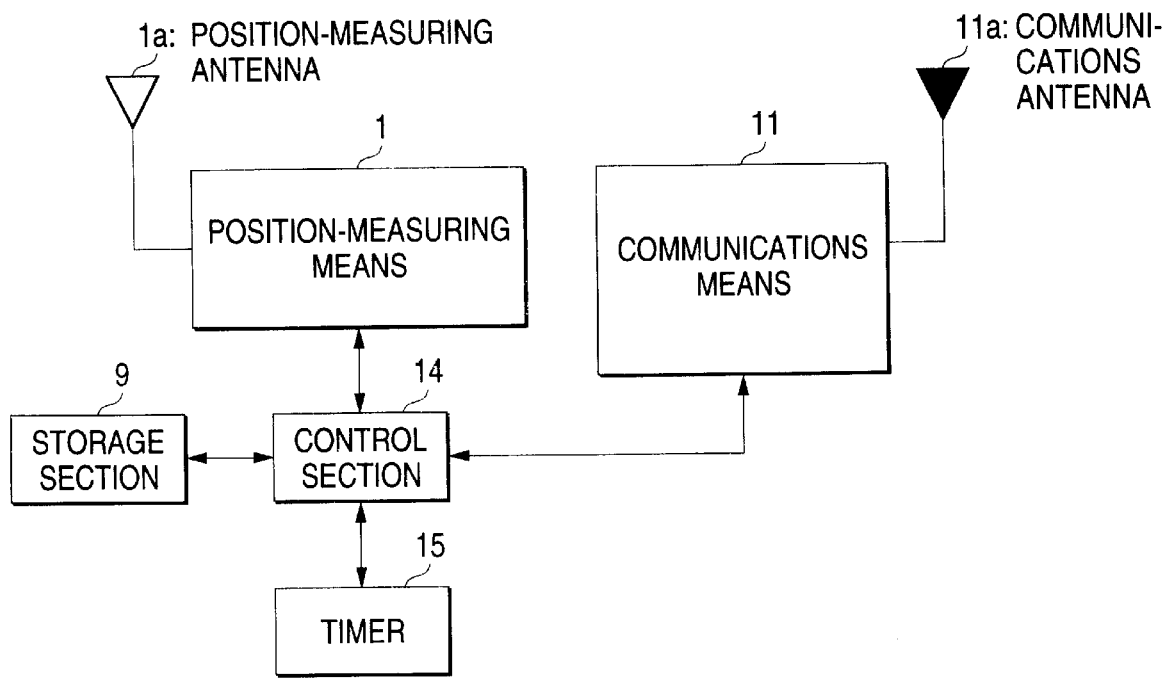
FIG. 8 is a block diagram showing the configuration of a position informing apparatus according to an eighth embodiment of the present invention.

FIG. 8 is a block diagram showing the configuration of a position informing apparatus according to the eighth embodiment. As shown in FIG. 8, reference numerals 1, 1a, 9, 11, and 11a designate identical with that described in connection with the sixth embodiment, and hence repeated explanation thereof is omitted here. Reference numeral 14 designates a control section for controlling activation/deactivation of the position-measuring means 1; and 15 designates a timer. In an initial state, a predetermined time interval is set in the timer 15 in advance. An interrupt arises in the control section 14 at the time interval. Upon receipt of an interrupt from the timer 15, the control section 14 turns on power to the position-measuring means 1. In accordance with a signal received by the antenna 1a, the position-measuring means 1 tracks three satellites or four or more satellites, thus effecting position-measuring computation. The control section 14 stores the thus-computed current position into the storage section 9, thereby turning off power to the position-measuring means 1.

The control section 14 determines a difference between a previously-position-measured position and a currently-position-measured position and changes the value of the timer 15 in accordance with the difference. When the travel velocity of the position informing apparatus is slow, the interval between position-measuring operations may be long. In contrast, if the travel velocity of the position informing apparatus is fast, the interval between position-measuring operations should be short. Accordingly, a time interval at which position-measurement is to be performed is changed in accordance with the rate of change in the position determined by the position-measuring means.

In the eighth embodiment, the position informing apparatus is constructed so as to change a time interval at which position-measurement is to be performed in accordance with the rate of change in position, thereby enabling position-measurement at every substantially-predetermined distance.

(Ninth Embodiment)

A ninth embodiment of the present invention relates to a position informing apparatus which changes a time interval at which position-measurement is to be performed in accordance with a velocity.

Figure 9:
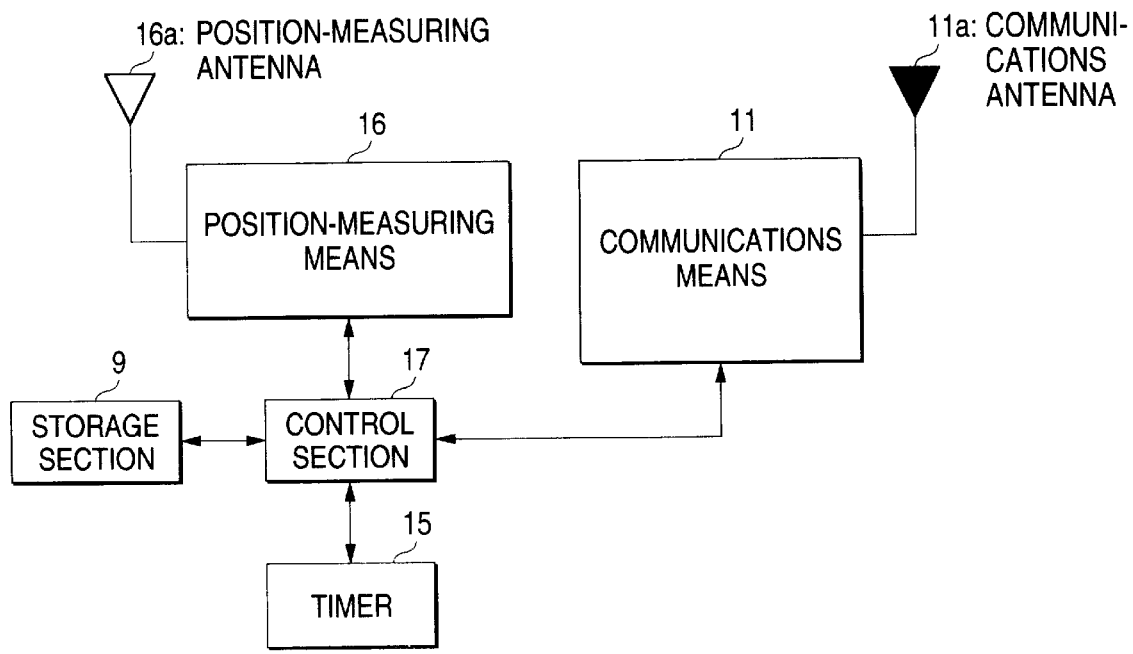
FIG. 9 is a block diagram showing the configuration of a position informing apparatus according to a ninth embodiment of the present invention.

FIG. 9 is a block diagram showing the configuration of a position informing apparatus according to the ninth embodiment. As shown in FIG. 9, reference numerals 9, 11, 11a, and 15 designate identical with that described in connection with the eighth embodiment, and hence repeated explanation thereof is omitted here. Reference numeral 16 designates position-measuring means such as a GPS receiver; 16a designates an antenna for position-measuring purpose which receives a signal sent from a GPS satellite; and 17 designates a control section for controlling activation/deactivation of power to the position-measuring means 16.

Upon receipt of an interrupt from the timer 15, the control section 17 turns on power to the position-measuring means 16. In accordance with a signal received by the antenna 16a, the position-measuring means 16 tracks three satellites or four or more satellites, thereby determining a current position through position-measuring computation and a travel velocity through velocity computation. The control section 17 receives the thus-computed current position and the travel velocity from the position-measuring means 16 and stores the position and the travel velocity into the storage section 9, thereby turning off power to the position-measuring means 16.

The control section 17 changes the value of the timer 15 in accordance with a currently-determined travel velocity. When the travel velocity of the position informing apparatus is slow, the interval between position-measuring operations may be long. In contrast, if the travel velocity is fast, the interval between position-measuring operations should be short. A time interval between position-measuring operations is changed in accordance with the travel velocity determined by the position-measuring means.

As mentioned above, in the ninth embodiment, the position informing apparatus is configured such that a time interval between position-measuring operations is changed in accordance with a velocity. Accordingly, position-measurement can be effected at every substantially-given distance.

(Tenth Embodiment)

A tenth embodiment of the present invention relates to a position informing apparatus which holds power in an activated state in only the signal demodulation section until position-measurement information is received from the signal demodulation section of the GPS receiver and which activates power to the position-measuring computation section upon receipt of the position-measuring information while deactivating power to the signal demodulation section.

Figure 10:
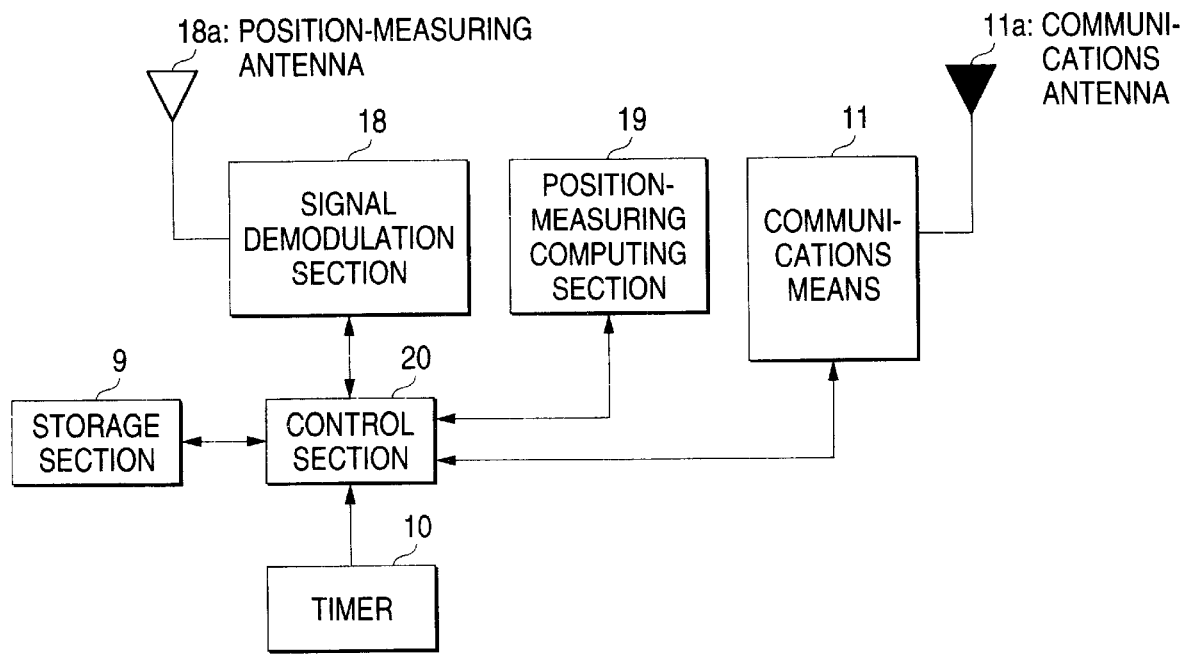
FIG. 10 is a block diagram showing the configuration of a position informing apparatus according to a tenth embodiment of the present invention.

FIG. 10 is a block diagram showing the configuration of a position informing apparatus according to the tenth embodiment of the present invention. As shown in FIG. 10, reference numerals 9, 10, 11, and 11a designate identical with that described in connection with the sixth embodiment, and hence repeated explanation thereof is omitted here. Reference numeral 18 designates a signal demodulation section for demodulating a signal sent from a GPS satellite; 18a designates an antenna for position-measuring purpose which receives a signal sent from a GPS satellite; 19 designates a position-measuring computation section for effecting position-measuring computation through use of a signal sent from the GPS satellite; and 20 designates a control section for controlling activation/deactivation of power to the signal demodulation section 18 and the position-measuring computation means 19.

The operation of the position informing apparatus having the above-described construction according to the tenth embodiment of the present invention will now be described. Upon receipt of an interrupt from the timer 10, the control section 20 turns on power to the signal demodulation section 18. If the signal demodulation means 18 can successfully track three satellites or four or more satellites in accordance with a signal received by the antenna 18a, the control section 20 receives position-measurement data from the signal demodulation section 18, stores the thus-received position-measurement data into the storage section 9, and then turns off power to the signal demodulation section 18. Subsequently, the control section 20 transfers the position-measurement data stored in the storage section 9 to the position-measuring computation section 19 by turning on power to the position-measuring computation section 19, receives a current position after the position-measuring section 19 has completed a position-measuring computation operation, saves the thus-computed position in the storage section 9, and turns off power to the position-measuring computation section 19.

As mentioned above, in the tenth embodiment, the position informing apparatus is constructed such that power to only the signal demodulation section is held in an ON state until the position informing apparatus receives position-measurement information from the signal demodulation section of the GPS receiver and such that power to the positioning computation section is turned on when the position informing apparatus has received position-measurement information, thereby turning off power to the signal demodulation section. Hence, mean power consumption of the position informing apparatus can be reduced.

(Eleventh Embodiment)

An eleventh embodiment of the present invention relates to a position informing apparatus which supplies a clock signal to only the signal demodulation section until position-measurement information is received from the signal demodulation section of the GPS receiver and which supplies a clock signal to the position-measuring computation section upon receipt of the position-measurement information, thereby stopping supply of a clock signal to the signal demodulation section.

Figure 11:
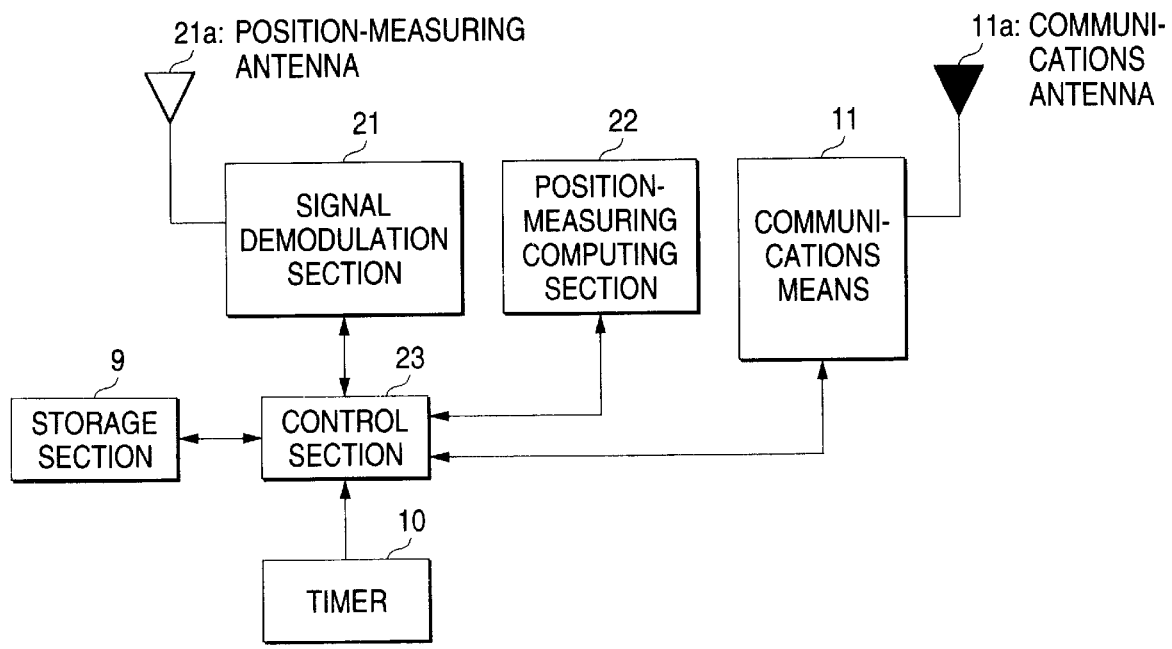
FIG. 11 is a block diagram showing the configuration of a position informing apparatus according to an eleventh embodiment of the present invention.

FIG. 11 is a block diagram showing the configuration of a position informing apparatus according to the eleventh embodiment of the present invention. As shown in FIG. 11, reference numerals 9, 10, 11, and 11a designate identical with that described in connection with the sixth embodiment, and hence repeated explanation thereof is omitted here. Reference numeral 21 designates a signal demodulation section for demodulating a signal sent from a GPS satellite; 21a designates an antenna for position-measuring purpose which receives a signal sent from a GPS satellite; 22 designates a position-measuring computation section for effecting position-measuring computation through use of a signal sent from the GPS satellite; and 23 designates a control section for controlling supply/stop of clock to the signal demodulation section 21 and the position-measuring computation means 22, this embodiment shows controlling supply/stop of clock in stead of controlling activation/deactivation of power in tenth embodiment.

As mentioned above, in the eleventh embodiment, the position informing apparatus is constructed such that clock is supplied to only the signal demodulation section until the position informing apparatus receives position-measurement information from the signal demodulation section of the GPS receiver and such that a clock signal is supplied to the position-measuring computation section when the position informing apparatus receives position-measurement information, thereby stopping supply of a clock signal to the signal demodulation section. Hence, mean power consumption of the position informing apparatus can be reduced.

(Twelfth Embodiment)

A twelfth embodiment of the present invention relates to a position informing apparatus which periodically receives position-measurement information by means of a GPS receiver, stores the thus-received information, and computes a current position from the position-measurement information only when having received a request concerning current position.

Figure 12:
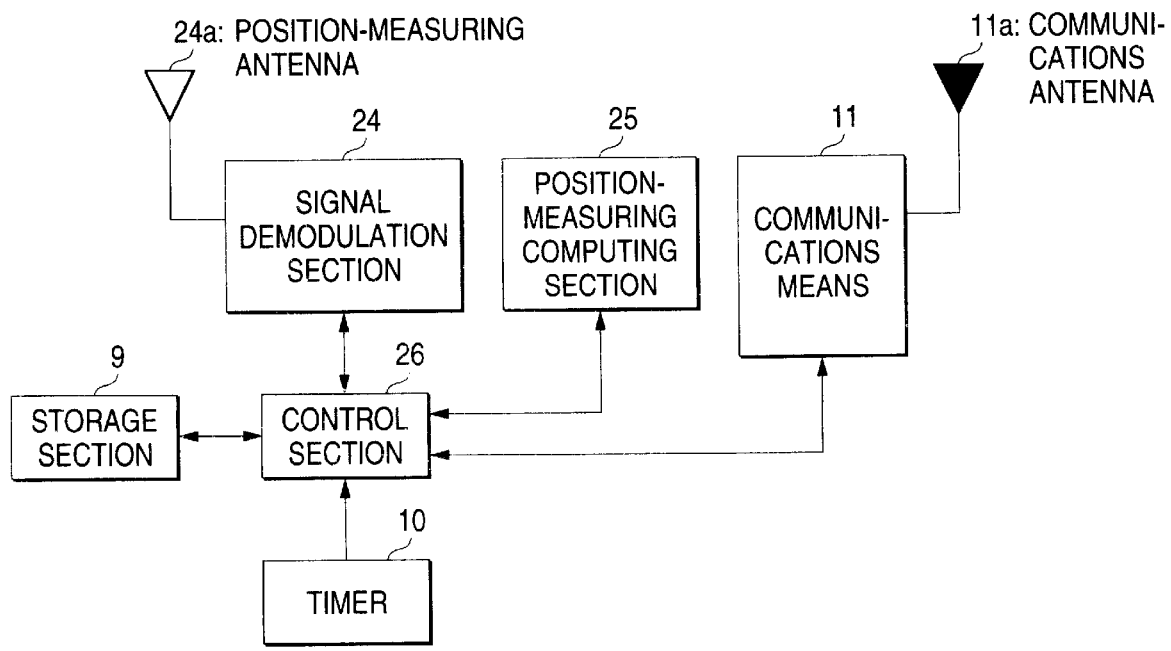
FIG. 12 is a block diagram showing the configuration of a position informing apparatus according to a twelfth embodiment of the present invention.
Figure 13:
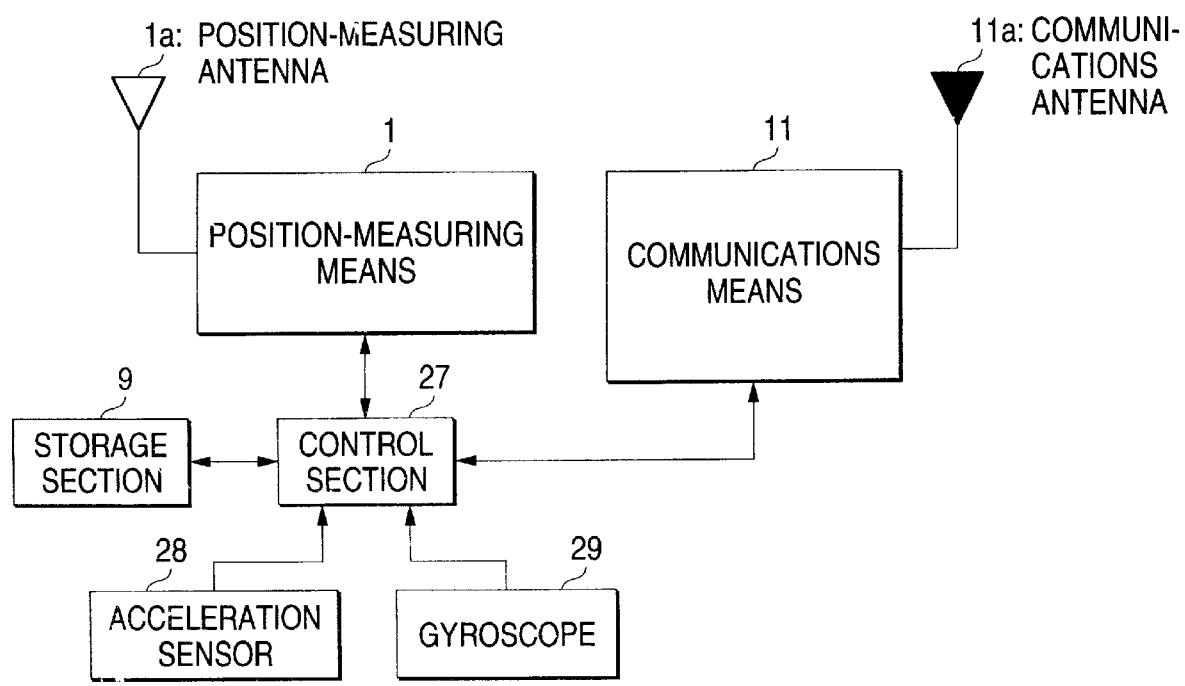
FIG. 13 is a block diagram showing the configuration of an conventional position informing apparatus.

FIG. 12 is a block diagram showing the configuration of a position informing apparatus according to the twelfth embodiment. As shown in FIG. 12, reference numerals 9, 10, 11, and 11a designate identical with that described in connection with the sixth embodiment, and hence repeated explanation thereof is omitted here. Reference numeral 24 designates a signal demodulation section for demodulating a signal sent from a GPS satellite; 24a designates an antenna for position-measuring purpose which receives a signal sent from a GPS satellite; 25 designates a position-measuring computation section for effecting position-measuring computation through use of a signal sent from the GPS satellite; and 26 designates a control section for controlling activation/deactivation of power to the signal demodulation section 24 and the position-measuring computation means 25.

The operation of the position informing apparatus having the above-described construction according to the twelfth embodiment of the present invention will now be described. Upon receipt of an interrupt from the timer 10, the control section 26 turns on power to the signal demodulation section 24. If the position-measuring means 24 can successfully track three satellites or four or more satellites in accordance with a signal received by the antenna 24a, the control section 26 receives position-measurement data from the signal demodulation section 24, stores the thus-received position-measurement data into the storage section 9, and then turns off power to the signal demodulation section 24.

If access is made to the communications means 11 from the outside, the communications means 11 issues to the control section 26 a request concerning current position. The control section 26 turns on power to the position-measuring computation section 25, thereby transferring the position-measurement data stored in the storage section 9 to the position-measuring computation section 25. After the position-measuring computation section 25 has completed a position-measuring computation operation, the control section 26 receives the current position, sends the current position to the communications means 11, and turns off power to the position-measuring computation section 25. The communications means 11 transmits the current position to the outside by way of the communications antenna 11a.

As mentioned above, in the twelfth embodiment, the position informing apparatus is constructed so as to periodically receive position-measurement information by means of a GPS receiver, to retain the thus received information, and to compute a current position from the position-measurement information only when a request concerning current position is received. Hence, mean power consumption of the position informing apparatus can be reduced.

Industrial Applicability

As is obvious from the above descriptions, according to the present invention, a position informing apparatus comprises position-measuring means for measuring the current position of the position informing apparatus; a control section for controlling power to the position-measuring means; communications means having a position-measuring request button; and means for turning on power to the position-measuring means only when a position-measuring request button is pressed, thereby effecting position-measuring operation. When a person having a position informing apparatus needs current position information, power to the position-measuring means is turned on only when the position-measuring button is pressed, thereby yielding an advantage of ability to reduce mean power consumption of the position informing apparatus.

Further, a position informing apparatus comprises position-measuring means for measuring the current position of the position informing apparatus; a control section for controlling power to the position-measuring means; communications means having a position-measuring request button; and means for turning on power to the position-measuring means only when existing buttons provided on communications means are pressed in a specific pattern, thereby effecting position-measuring operation. When a person having a position informing apparatus needs current position information, power to the position-measuring means is turned on only when existing buttons are pressed in a specific pattern, thereby yielding an advantage of ability to reduce mean power consumption of the position informing apparatus.

Since the position informing apparatus is equipped with means for effecting position-measuring operation only when the communications means has dialed a specific number, position-measuring operation is automatically effected only when a specific number, such as an emergency call, is dialed. As a result, there is yielded an advantage of ability to reduce mean power consumption of the position informing apparatus.

Since the position informing apparatus is equipped with means for effecting position-measuring operation only when the communications means has received an incoming call from a specific number, a system which manages the position of the position informing apparatus by way of a center can automatically perform position-measuring operation only when an incoming call from a specific number is received. As a result, there is yielded an advantage of ability to reduce mean power consumption of the position informing apparatus.

Further, the position informing means is provided with means for inhibiting execution of position-measuring operation when the communications means is outside a communicable range thereof, thereby avoiding a useless position-measuring operation, which would otherwise be caused when the position informing apparatus is unable to perform communications. As a result, there is yielded an advantage of ability to reduce mean power consumption of the position informing apparatus.

A position informing apparatus is equipped with position-measuring means for position-measuring the current position of the apparatus; a control section for controlling power to the position-measuring means; communications means; a storage section for storing the current position; and a timer for periodically outputting an instruction for executing position-measuring operation. For a case where position information is required at a position where position-measurement cannot be performed, position-measuring operation is performed periodically, thereby yielding an advantage of ability to retain position information.

Further, the position informing apparatus is equipped with means for effecting control operation so as to prevent position-measurement during a communication period of the communication means. There can be prevented useless position-measurement, which would otherwise arise when position-measurement is hindered by strong interference of electronic waves from a portable cellular phone. As a result, there is yielded an advantage of ability to reduce mean power consumption of the position informing apparatus.

The position informing apparatus is further provided with means for changing a time interval at which position-measurement is to be performed, in accordance with a change in the position determined by the position-measuring means. A time interval at which position-measurement is to be performed is changed in accordance with a change in the position of the apparatus such that the interval between position-measuring operations is not shortened more than required. As a result, there is yielded an advantage of ability to reduce mean power consumption of the position informing apparatus.

The position informing apparatus is further provided with means for changing a time interval at which position-measurement is to be performed, in accordance with a change in the velocity of determined by the position-measuring means. A time interval at which position-measurement is to be performed is changed in accordance with a change in the velocity of the apparatus such that the interval between position-measuring operations is not shortened more than required. As a result, there is yielded an advantage of ability to reduce mean power consumption of the position informing apparatus.

The position informing apparatus is further equipped with means for supplying power individually to a signal demodulation section and a position-measuring computation section of the position-measuring means; means for turning on power to only the signal demodulation section until position-measurement information is received; and means for turning off power to the signal demodulation section by means of turning on power to the position-measuring computation section upon receipt of position-measurement information. Accordingly, power to the signal receiving section of the position-measuring means is separated from power to the position-measuring computation section of the same. Power is supplied to only a required section, thereby yielding an advantage of ability to reduce mean power consumption of the position informing apparatus.

The position informing apparatus is equipped with means for supplying a clock signal individually to a signal demodulation section and a position-measuring computation section of the position-measuring means; means for supplying a clock signal to only the signal demodulation section until position-measurement information is received; and means for stopping supply of the clock signal to the signal demodulation section by means of supplying a clock signal to the position-measuring computation section when position-measurement information is received. Accordingly, supply of a clock signal to the signal receiving section of the position-measuring means is separated from supply of a clock signal to the position-measuring computation section of the same. A clock signal is supplied to only a required section, thereby yielding an advantage of ability to reduce mean power consumption of the position informing apparatus.

The position informing means is provided with means for periodically receiving position-measurement information and means for effecting a control operation such that position-measuring operation is performed only when a position-measuring request is received. As a result, position-measuring operation is effected only when a request for position-measuring operation is received. As a result, there is yielded an advantage of ability to reduce mean power consumption of the position informing apparatus.

What is claimed is:

1. A position informing apparatus comprising:
    position-measuring means which determines a current position of the position informing apparatus;
    a control section which controls power to the position-measuring means;
    communications means; and
    a position-measuring request button which, when pressed, triggers the control section to activate a position-measuring operation by turning on power to the position-measuring means, wherein the control section automatically turns off power to the position measuring means when the current position is determined.

2. A position informing apparatus comprising:
    position-measuring means which determines a current position of the position informing apparatus;
    a control section which controls power to the position-measuring means, and
    communications means, wherein
    the control section turns on power to the position measuring means when existing buttons provided on the communications means are pressed in a specific pattern, wherein the control section automatically turns off power to the position measuring means when the current position is determined.

3. A position informing apparatus according to claim 2, wherein the specific pattern is a specific number.

4. A position informing apparatus according to claim 2, wherein the control section turns on power to the position-measuring means when the communications means has received an incoming call originating from a specific number, wherein the control section automatically turns off power to the position measuring means when the current position is determined.

5. A position informing apparatus according to claim 1 or 2, further comprising means which inhibits execution of position-measuring operation when the communications means is outside a communicable range thereof.

6. A position informing apparatus comprising:
    position-measuring means which determines a current position of the position informing apparatus;
    a control section which controls power to the position-measuring means;
    communications means;
    a storage section which stores the current position; and
    a timer which periodically outputs an instruction for executing position-measuring operation, by means of turning on power to the position-measuring means by way of the control section.

7. A position informing apparatus according to claim 6, further comprising means which effects control operation so as to prevent position-measurement during a communication period of the communication means.

8. A position informing apparatus according to claim 6, further comprising means which changes a time interval at which position-measurement is to be performed, in accordance with a change in the position determined by the position-measuring means.

9. A position informing apparatus according to claim 6, further comprising means which changes a time interval at which position-measurement is to be performed, in accordance with a change in the velocity determined by the position-measuring means.

10. A position informing apparatus according to claim 6, wherein the position-measuring means includes:
    a signal demodulation section which demodulates a signal for determining a current position of the position informing apparatus;
    a position-measuring computation section for effecting a computation operation in order to determine the current position on the basis of a demodulated signal;
    means which supplies power individually to the signal demodulation section and the position-measuring computation section of the position-measuring means;
    means which turns on power to only the signal demodulation section until position-measurement information output from the signal demodulation section is received; and
    means which turns off power to the signal demodulation section by means of turning on power to the position-measurement computation section when the position-measurement information output from the signal demodulation section is received.

11. A position informing apparatus according to claim 6, wherein the position-measurement means includes:
    a signal demodulation section for demodulating a signal for determining a current position of the position informing apparatus;
    a position-measuring computation section which performs a computation operation in order to determine the current position on the basis of a demodulated signal;

means which supplies a clock signal individually to the signal demodulation section and the position-measuring computation section of the position-measuring means;

means which supplies the clock signal to only the signal demodulation section until the position-measurement information output from the signal demodulation section is received; and means for stopping supply of the clock signal to the signal demodulation section when the position-measurement information output from the signal demodulation section is received by supplying the clock signal to the position-measuring computation section.

12. A positioning informing apparatus according to claim 10 or 11, further comprising means which periodically receives the position-measurement information output from the signal demodulation section and storing the position-measurement information into the storage section, and means which reads out the position-measurement information from the storage section only when a position-measuring request is received, thereby causing the position-measuring computation section to performing position-measuring operation.

13. The apparatus according to claim 1, wherein the communication means may continue operating or be in a standby mode even after the control section has turned off power to the position-measuring means.

14. The apparatus according to claim 2, wherein the communication means may continue operating or be in a standby mode even after the control section has turned off power to the position-measuring means.

15. A communication apparatus with a position determining function comprising:

position-measuring means which determines a current position of the position informing apparatus when powered on;

control means which controls power to the position-measuring means, wherein, when the communication apparatus is activated, power is not provided to the position-measuring means until a request for measuring a current position has been received; and communications means, wherein the control means turns on power to the position-measuring means when the request for measuring a current position has been received, wherein power to the position measuring means is automatically turned off by said control means when the current position has been determined, and further wherein the communication means may continue operating or be in a standby mode even after the control means has turned off power to the position measuring means.

16. The apparatus of claim 15, wherein said communication means includes a position-measuring request button, and further wherein activating the position-measuring request button sends the request for determining a current position to the control means.

17. The apparatus of claim 15, wherein activating buttons provided on the communications means for providing communications functions in a specific pattern sends the request for determining a current position to the control means.

18. The apparatus of claim 17, wherein the specific pattern is a phone number or a communications address.

19. The apparatus of claim 15, wherein receiving a call from a specific number or from a specific originator sends the request for determining a current position to the control means.

* * * * *

UNITED STATES PATENT AND TRADEMARK OFFICE
CERTIFICATE OF CORRECTION

PATENT NO.      : 6,448,927 B1                                                                    Page 1 of 1
DATED           : September 10, 2002
INVENTOR(S)     : Toshihiro Ishigaki et al.

It is certified that error appears in the above-identified patent and that said Letters Patent is hereby corrected as shown below:

<u>Title page,</u>
Item [57], ABSTRACT,
Lines 1-26, please delete ABSTRACT in its entirety and insert the following ABSTRACT:

-- A position informing apparatus that provides the capability to measure one's position by activating a position measuring function, such as by utilizing the GPS, for example. The position measuring function is normally inactive and its components not powered to reduce power usage. Upon the occurrence of a specific event, such as the pushing of a button, the reception of a call from a specific number, or the dialing of a code or number, for example, the position measuring components are powered on and the position measuring function activated. After the position has been determined, the position measuring components are automatically powered off to save power. Further, the device may inhibit powering on the position measuring components when measuring a position would be futile, such as when in a tunnel, for example. --

<u>Column 3,</u>
Line 41, please delete "OUR", and insert therefor -- OUT --.

Signed and Sealed this

Thirty-first Day of December, 2002

JAMES E. ROGAN
*Director of the United States Patent and Trademark Office*